United States Patent [19]

Carminati et al.

[11] 4,388,948

[45] Jun. 21, 1983

[54] ARTICULATED LOADING ARM FOR THE TRANSFER OF FLUIDS

[75] Inventors: Jean Carminati; Thomas Ehret, both of Malay le Petit; Gerard Ovieve, Sens; Henry-Albert Thoor, Sens, all of France

[73] Assignee: FMC Corporation, Chicago, Ill.

[21] Appl. No.: 150,831

[22] Filed: May 19, 1980

[30] Foreign Application Priority Data

May 28, 1979 [FR] France ............................ 79 13463
Jan. 23, 1980 [FR] France ............................ 80 01430

[51] Int. Cl.[3] ........................................ F16L 3/00

[52] U.S. Cl. ............................ 137/615; 141/387; 285/168

[58] Field of Search ..................... 137/615, 236 OS; 141/387, 279, 388; 285/168, 190

[56] References Cited

U.S. PATENT DOCUMENTS

| | | | |
|---|---|---|---|
| 597,040 | 1/1898 | Vaughan | 285/168 |
| 1,961,198 | 6/1934 | Corley | 285/168 |
| 3,126,913 | 3/1964 | Green et al. | 141/387 |
| 3,176,730 | 4/1965 | Knight | 137/615 |
| 3,661,170 | 5/1972 | Mitchell | 141/388 |
| 3,825,045 | 7/1974 | Bloomquist | 137/615 |
| 4,090,538 | 5/1978 | Kotcharian | 141/100 |
| 4,121,616 | 10/1978 | Lochte et al. | 137/615 |
| 4,202,372 | 5/1980 | Gibbons | 137/615 |
| 4,220,177 | 9/1980 | Gill | 137/615 |
| 4,318,423 | 3/1982 | De Graaf | 137/615 |

FOREIGN PATENT DOCUMENTS

| | | | |
|---|---|---|---|
| 2514149 | 10/1975 | Fed. Rep. of Germany | 137/615 |
| 7631119 | 10/1976 | France . | |

*Primary Examiner*—A. Michael Chambers

*Attorney, Agent, or Firm*—W. William Ritt, Jr.; Richard B. Megley

[57] ABSTRACT

An articulated fluid loading arm especially suited for transferring petroleum from a storage or loading terminal to a marine tanker, and for returning vapor from the tanker to the terminal, comprising a support boom pivotally mounted on the deck of the terminal, a pair of fluid conduits extending along the boom from risers at the terminal, and a dual flow-passage drop-pipe assembly suspended from an outboard end of the boom. The drop-pipe assembly comprises a pair of upper conduit members, a pair of lower conduit members and a pair of intermediate conduit members pivotally interconnected by a plurality of knee joints and swivel joints into a pair of articulated diamond-shaped structures. One set of upper, intermediate and lower conduit members comprises an assembly for the transfer of fluid from the terminal to the tanker, and the other set of conduit members provides an assembly for the return of vapors from the tanker to the terminal. A support cable extends from a tanker connection means on the lower end of the drop-pipe assembly to the outboard end of the boom and then along the boom to a winch for lowering, raising and supporting the drop pipe assembly.

8 Claims, 10 Drawing Figures

ARTICULATED LOADING ARM FOR THE TRANSFER OF FLUIDS

BACKGROUND OF THE INVENTION

1. Field of the Invention

This invention relates to fluid loading arms, and more particularly to articulated marine loading arms for transferring fluid between an offshore facility and a tanker or other marine vessel.

2. Description of the Prior Art

The production of oil and gas from offshore wells has developed into a major endeavor of the petroleum industry and this growth has fostered extensive interest and investigation into means for transporting the produced fluids to shore-based refineries or storage facilities. Although in many instances pipelines are employed for this purpose, more and more wells are being drilled and completed in deepwater locations where the use of marine tankers of very large capacity constitutes the most practical and efficient transportation method, such as where pipelines would be too costly or difficult to construct.

Some of the prior art loading facilities include a fluid handling means such as a mooring buoy or floating platform to which a tanker may be moored while loading. Connected to the buoy or floating platform are a number of flexible hoses for transferring fluid to or from the tanker, and a tender is normally required to assist the tanker in picking up these hoses for connection to the tanker's manifold. Such an arrangement not only requires the use of a tender, but movement of the tanker may cause the flexible hoses to break.

Other prior art facilities include a tower or other vertical support structure mounted on a floating platform or extending up from the ocean floor, with a pipe-supporting boom pivotally connected to the top of the tower and extending generally horizontally therefrom. Pipes are provided for conducting fluid to the outer end of the support boom, and an articulated pipe assembly extends from the boom to the marine tanker. Cables raise and lower an outer end of the articulated pipe so that the pipe may be secured to or moved away from a tanker manifold. One such facility is described in Lochte et al U.S. Pat. No. 4,121,616, issued Oct. 24, 1978.

SUMMARY OF THE INVENTION

The present invention comprises an articulated loading arm having one set of articulated conduit members for transferring fluid from a first handling means to a second handling means, and another set of articulated conduit members for returning vapors to the first handling means. The present invention also provides for relative movement between the first and the second handling means. This invention overcomes some of the disadvantages of the prior art by employing a tower or other suitable vertical support structure which is mounted on a platform or other first handling means, and a generally horizontally-disposed support boom having one end thereof pivotally connected to the top of the tower or support structure. A drop-pipe assembly on the support boom includes a pair of rigid upper conduit members, a pair of rigid lower conduit members, and a pair of intermediate conduit members having means for pivotally connecting the upper end of each of the upper conduit members to an outboard portion of the support boom. Means are provided for pivotally connecting an upper end of the intermediate conduit members to the lower end of a corresponding one of the upper conduit members, and for pivotally connecting a lower end of each of the intermediate conduit members to an upper end of a corresponding one of the lower conduit members. A support cable means for supporting the weight of the conduit assembly and the fluid therein is connected to each of the lower conduit members so that the conduit members can be raised and lowered in accordance with the relative motion of the boom and the second fluid handling means. Means are provided for transporting fluid or vapors between the first fluid handling means and the upper end of each of the upper conduit members.

DESCRIPTION OF THE PREFERRED EMBODIMENT

Figure 1:
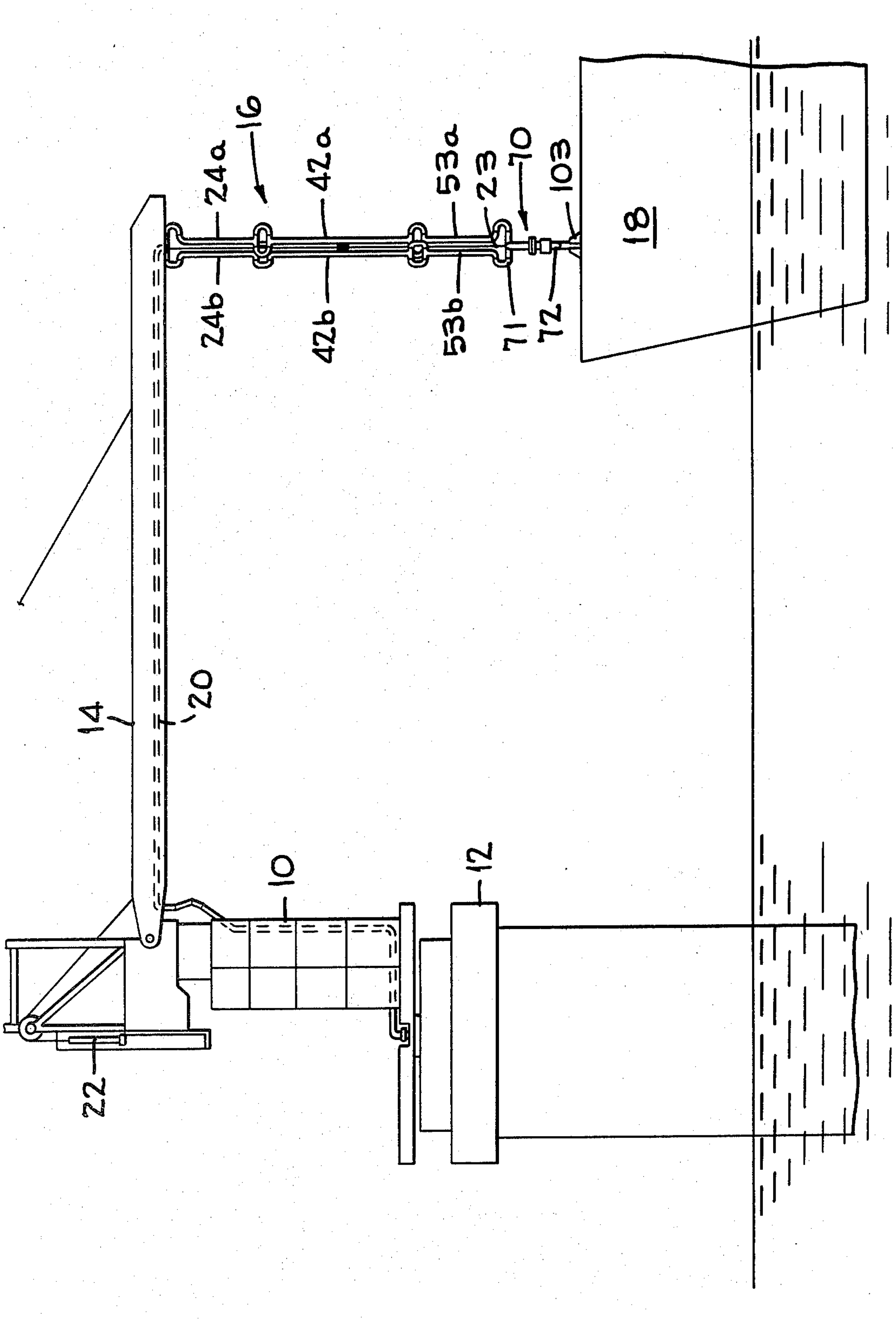
FIG. 1 is a side elevation of an articulated fluid loading arm according to the present invention, the arm shown connected in operating position to a marine tanker.

An articulated fluid loading arm in accordance with the present invention comprises a tower or other suitable vertical support structure 10 (FIG. 1) mounted on the top of a platform 12 and having a generally horizontally disposed boom 14 pivotally connected at the inboard end thereof to the tower 10. An articulated vertical portion 16 of the loading arm is connected between the outboard end of the boom 14 and a marine tanker 18. A pipe assembly 20 is connected to the upper end of the articulated vertical portion 16 and extends through the boom 14 and downward through the tower 10 and platform 12 to a fluid source (not shown). A hydraulic tensioner 22 (FIG. 1) and a pair of cables 23 (FIGS. 1-3) provide means for supporting the weight of the articulated vertical portion of the loading arm while the tanker moves in the sea. The tensioner 22 is a type which is widely used for supporting heavy loads suspended from floating structures, and details of this commonly used device are not considered to be part of this invention.

The articulated vertical portion 16 of the loading arm includes a pair of upper conduit members *24a,24b* (FIGS. 2,3) that are connected at their upper ends to corresponding 180° elbows 29a,29b by a pair of swivel joints 28a,28b. The elbow 29a is coupled to the outer end of the pipe assembly 20a by a plurality of elbows 30a–30d (FIGS. 2,3) interconnected by a pair of swivel joints 31a,34a and by a length of pipe 35a. The 180° elbow 29b is similarly coupled to the outer end of the pipe assembly 20b by a plurality of elbows 36a–36d, swivel joints 31b,34b and a length of pipe 35b. The lengths of pipe 35a,35b are each welded or otherwise connected to a generally circular brace 37a having a pair of guide holes 38a,38b for guiding the cables 23. The swivel joints 34a,34b allow the vertical portion 16 of the loading arm to pivot back and forth about a horizontal axis A (FIGS. 2,3), and the swivel joints 31a,31b allow the vertical portion to pivot from side to side about another horizontal axis B (FIGS. 2,4) that is perpendicular to axis A.

A pair of support pipes 40a,40b (FIG. 3) and a pair of brackets 41a,41b connected between the horizontal boom 14 and the respective elbows 30c,36c provide support for the vertical portion 16 of the loading arm. The pipes 40a,40b are welded or otherwise secured to the elbows 30c,36c, and the brackets 41a,41b are welded or otherwise secured to the boom 14 and to the upper ends of the support pipes 40a,40b. The lower ends of the upper conduit members 24a,24b (FIGS. 2–4) are connected respectively to the upper ends of a pair of intermediate conduit members 42a,42b by a pair of double knee joints 46a,46b. The double knee joints (FIGS. 2,4) each include a pair of pipe Tees 47, a pair of 180° pipe elbows 48, and a plurality of swivel joints 52. The lower ends of the intermediate conduit members are similarly connected to the upper ends of a pair of lower conduit members 53a,53b by a pair of double knee joints 54a,54b which include a plurality of pipe Tees 57, 180° pipe elbows 58, and swivel joints 59. The midpoints of the intermediate conduit members 42a,42b are pivotally interconnected by a ball joint 63 (FIGS. 2–4) or by other pivot means.

Figure 3:
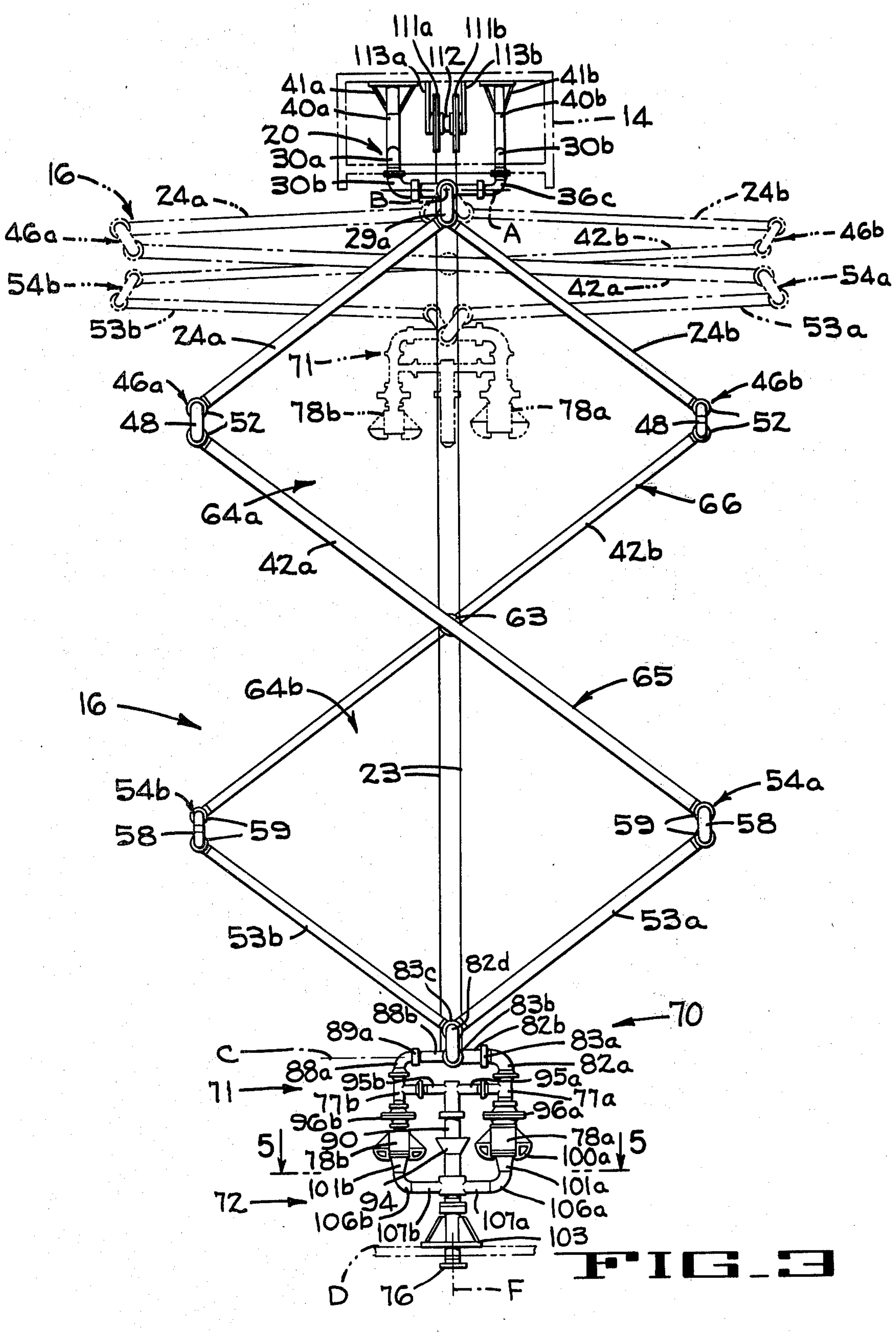
FIG. 3 is a front elevation of a portion of the loading arm of FIG. 1, showing details of the vertical portion of the arm.
Figure 4:
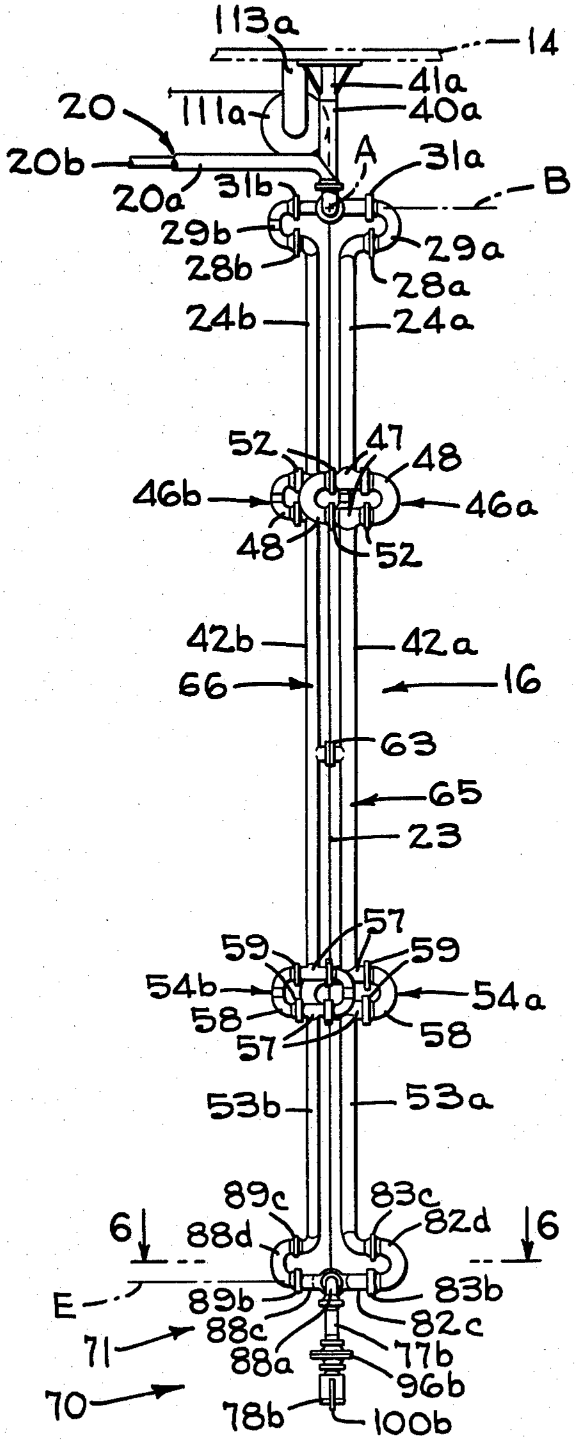
FIG. 4 is a side elevation of a portion of the loading arm of FIG. 1 in an extended position.

The doubled knee joints 46a,46b,54a,54b and the ball joint 63 facilitate the raising and lowering of the lower end of the articulated vertical portion 16 of the loading arm. When the loading arm is viewed from the front, the vertical portion 16 forms a pair of articulated diamonds 64a,64b (FIG. 3) each having one corner at the top and another corner at the bottom. The diamonds are formed from two assemblies lying in parallel planes as best seen in FIG. 4 with an outermost assembly 65 including the interconnected conduit members 24a,42a and 53a in a vertical plane nearest the outer end of the boom 14, and an inner assembly 66 including the interconnected conduit members 24b,42b and 53b in a vertical plane between the outermost assembly and the support structure 10 (FIG. 1). The outermost assembly 65 and the pipe assembly 20a may be used to convey fluid to the tanker 18 (FIG. 1) from a fluid source in the platform 12, and the inner assembly 66 may be used to convey vapor from the tanker 18 back to the fluid source.

Figure 2:
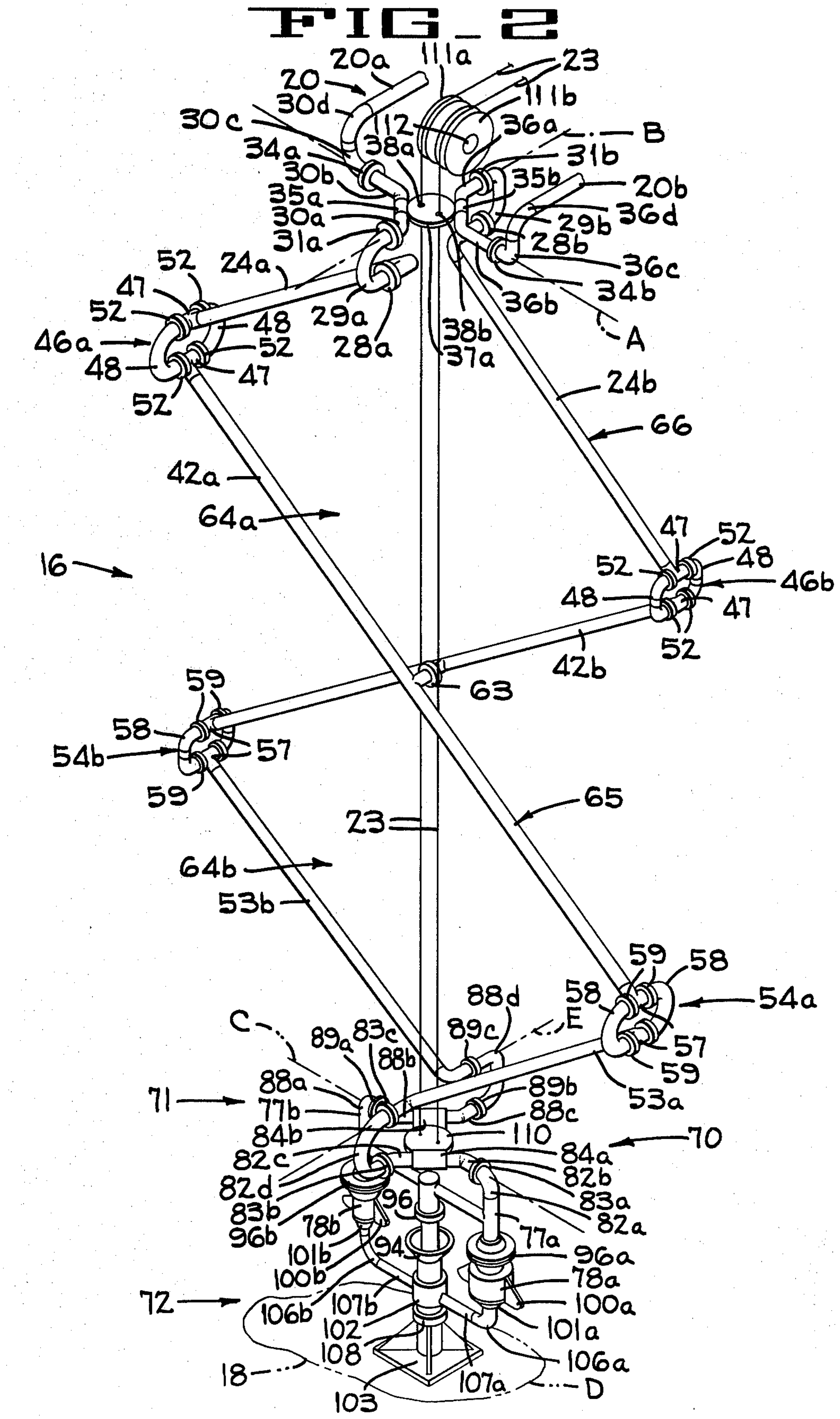
FIG. 2 is an isometic drawing of the vertical portion of the loading arm of FIG. 1.
Figure 6:
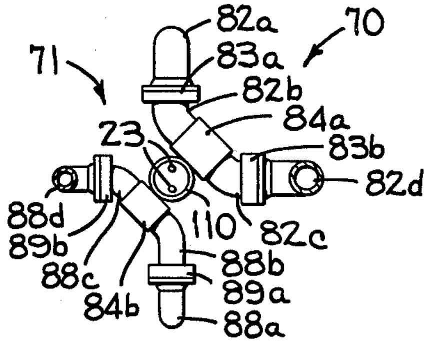
FIG. 6 is a horizontal section taken along the line 6—6 of FIG. 4.

An articulated connecting device 70 (FIGS. 1–4) connects the lower ends of the lower conduit members 53a, 53b to corresponding ones of a pair of tanker manifolds. One embodiment of the connecting device 70 includes an arm section 71 attached to the lower end of the vertical portion 16, and a tanker section 72 attached to the deck D of a tanker and connected to the inner and outer portion of a coaxial tanker manifold 76. The arm section 71 includes a pair of vertical pipes 77a,77b each having a valve 78a,78b connected to the lower end thereof. The vertical pipe 77a is connected to the lower end of the lower conduit member 53a (FIGS. 2,3,6) by a plurality of pipe elbows 82a–82d, swivel joints 83a–83c and a length of pipe 84a. The vertical pipe 77b is connected to the lower end of the lower conduit member 53b by a plurality of pipe elbows 88a–88d, swivel joints 89a–89c and a length of pipe 84b. The swivel joints 83a,89a allow the arm section 71 to pivot back and forth about an axis C (FIGS. 2,3) and the swivel joints 83c, 89c allow the arm section to pivot from side to side about an axis E (FIGS. 2,4).

A guide probe 90 (FIGS. 2,3) extends downward through the center of the arm section 71 into a guide funnel 94 secured to the tanker section 72. A pair of horizontal members 95a,95b are connected between the guide probe and the corresponding vertical pipes 77a,77b. A rapid disconnect means 96 between the upper and the lower portions of the probe 90 provides for emergency disconnection of the arm sections 71 from the tanker section 72. Rapid disconnect means 96a,96b are also included between the pipes 77a,77b and the valves 78a,78b. These disconnect means are made by several manufacturers and are widely used throughout the industry.

Figure 5:
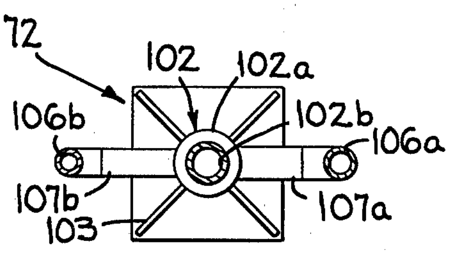
FIG. 5 is a horizontal section taken along the line 5—5 of FIG. 3.

The lower end of the arm section 71 includes a pair of pipe clamps 100a,100b for connecting each of the upper valves 78a,78b to a corresponding one of a pair of valves 101a,101b at the upper end of the tanker section 72. The valve 101a is connected to an outer passage 102a of a coaxial pipe 102 (FIGS. 2,3,5) by an elbow 106a and a length of horizontal pipe 107a. The coaxial pipe 102 is rotatably connected to the coaxial tanker manifold 76 and to a bracket 103 by a coaxial swivel joint 108. The bracket is welded or otherwise secured to the deck D of the tanker, and the valve 101b is connected to an inner passage 102b of the pipe 102 by an elbow 106b and a length of horizontal pipe 107b. The coaxial swivel joint 108 allows the tanker section 72 of the connecting device 70 to pivot about a vertical axis F to align valves 101a,101b with pipe clamps 100a,100b, respectively, and connects the outer passage 102a (FIG. 5) of the swivel joint and an outer passage of the tanker manifold 76 (not shown) to the lower conduit member 53a. Fluid can be transferred from the pipe assembly 20a (FIG. 3), through the conduit members 24a,42a,53a to the outer passage of the tanker manifold 76, and vapor can be transferred from the inner passage of the tanker manifold 76 through the conduit members 53b,43b,24b to the pipe assembly 20b.

A generally cylindrical bracket 110 (FIGS. 2,6), welded or otherwise secured to the pipes 84a,84b, is connected to the lower ends of the support cables 23 for lifting and supporting the connecting device 70 and the articulated portion 16 of the loading arm. The cables 23 are threaded over a pair of sheaves 111a,111b (FIGS. 2–4) which are rotatably connected to the boom 14 by a pin 112 mounted in the lower ends of a pair of brackets 113a,113b. The upper ends of the brackets 113a,113b are welded or otherwise connected to the horizontal boom 14.

Figure 7:
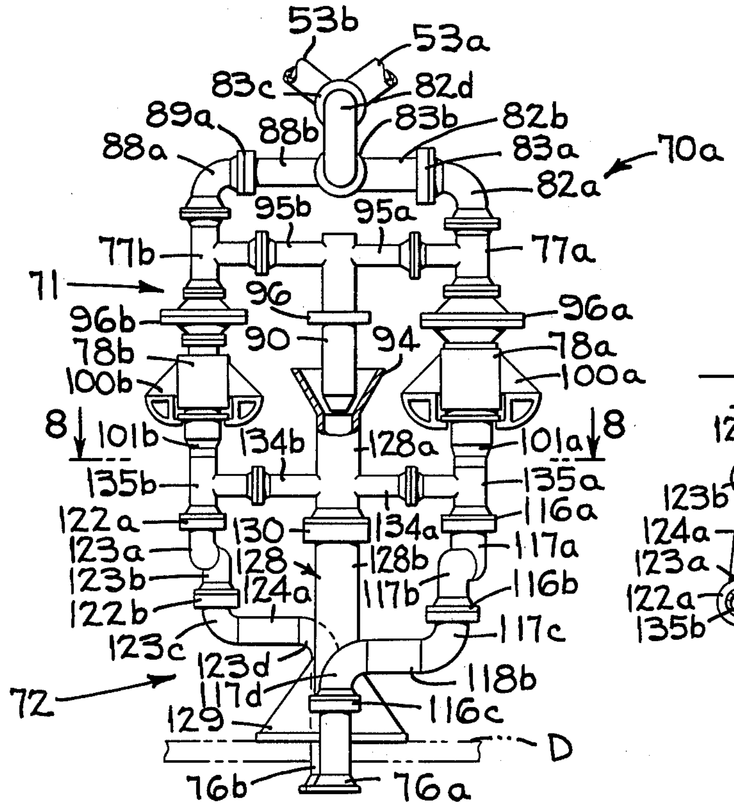
FIG. 7 is an enlarged front elevation of a second embodiment of the lower end of the vertical portion of a loading arm of the present invention.
Figure 8:
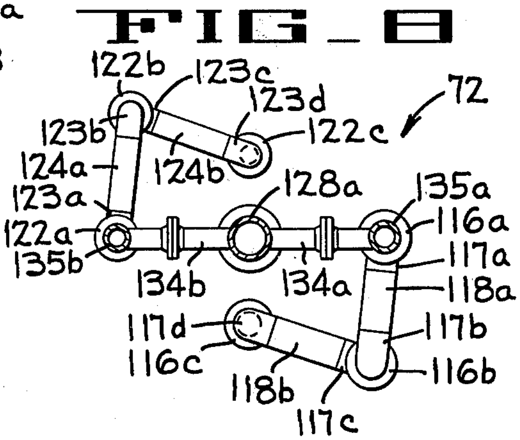
FIG. 8 is a horizontal section taken along the line 8—8 of FIG. 7.

Another embodiment 70a of the articulated connecting device, illustrated in FIGS. 7 and 8, includes means for connecting the lower conduit members 53a,53b to a pair of separated tank manifolds 76a,76b. The arm section 71 of the connecting device is identical to the embodiment shown in FIGS. 2–6, but the tanker section 72 has been modified for connection to the separated manifolds. The elements in the second embodiment which are identical or similar to the elements of the first embodiment of FIGS. 2–6 have been labeled with identical or similar numerals.

The valve 101*a* is connected to a tanker manifold 76*a* by a plurality of swivel joints 116*a*–116*c*, pipe elbows 117*a*–117*d* and lengths of pipe 118*a*,118*b*. The valve 101*b* is connected to the tanker manifold 76*b* by a plurality of swivel joints 122*a*–122*c*, pipe elbows 123*a*–123*d* and lengths of pipe 124*a*,124*b*. The tanker section 72*a* of the connecting device is supported by a vertical pipe 128 secured to the deck D of the tanker by bracket 129 which is welded or otherwise connected to the pipe 128 and to the deck D. A swivel joint 130, connected between an upper portion 128*a* and a lower portion 128*b* of the vertical pipe allows the upper portion 128*a* to rotate relative to the lower portion in order to position the valves 101*a*,101*b* in position for connection to the pipe clamps 100*a*,100*b*, respectively. The valve 101*a* is rigidly secured to the vertical pipe 128*a* by a horizontal member 134*a* and a T-section of pipe 135*a*, the lower end of the T-section being connected to the swivel joint 116*a*. The valve 101*b* is rigidly connected to the vertical pipe 128*a* by a horizontal member 134*b* and a T-section of pipe 135*b*, and the lower end of section 135*b* is connected to the swivel joint 122*a*.

Figure 9:
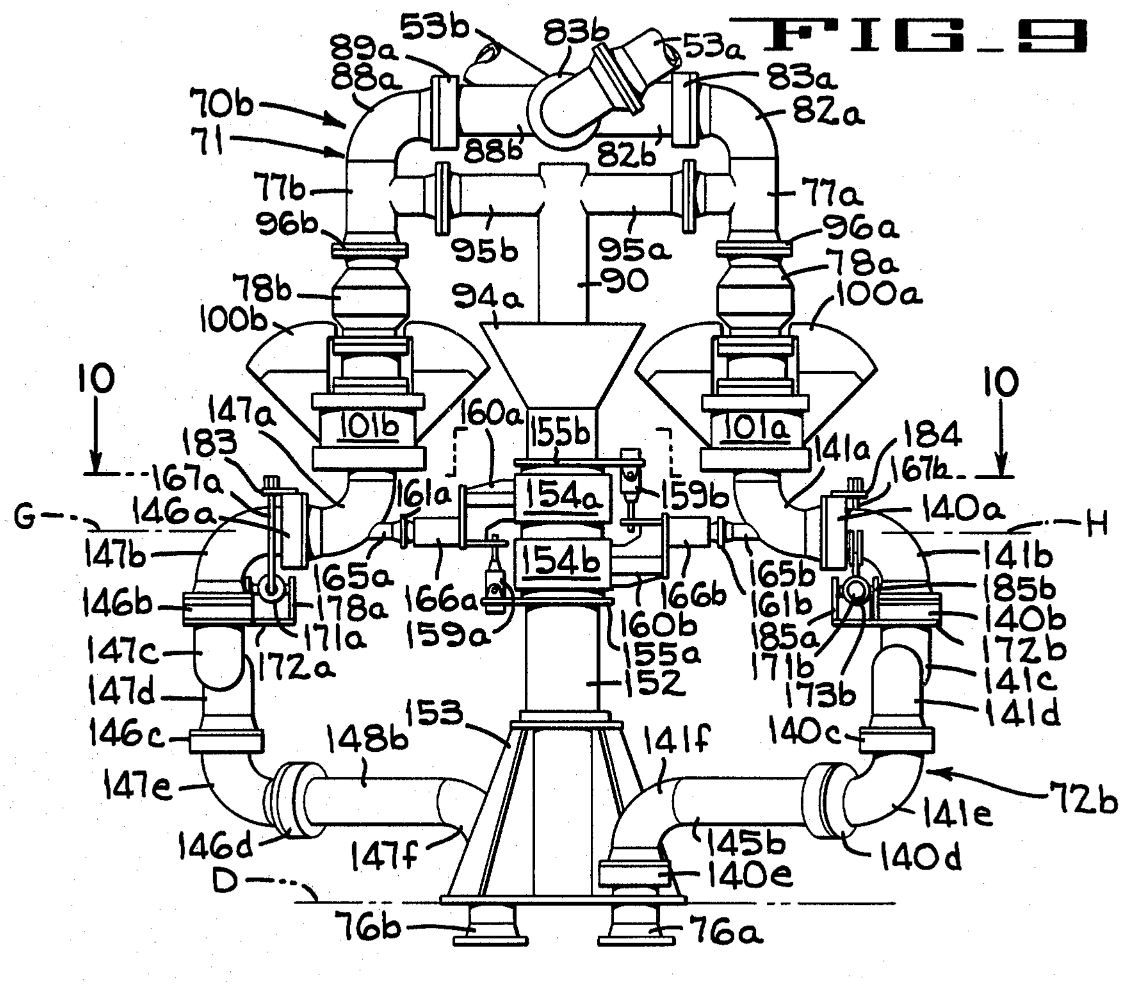
FIG. 9 is an enlarged front elevation of a third embodiment of the lower end of the vertical portion of a loading arm of the present invention.
Figure 10:
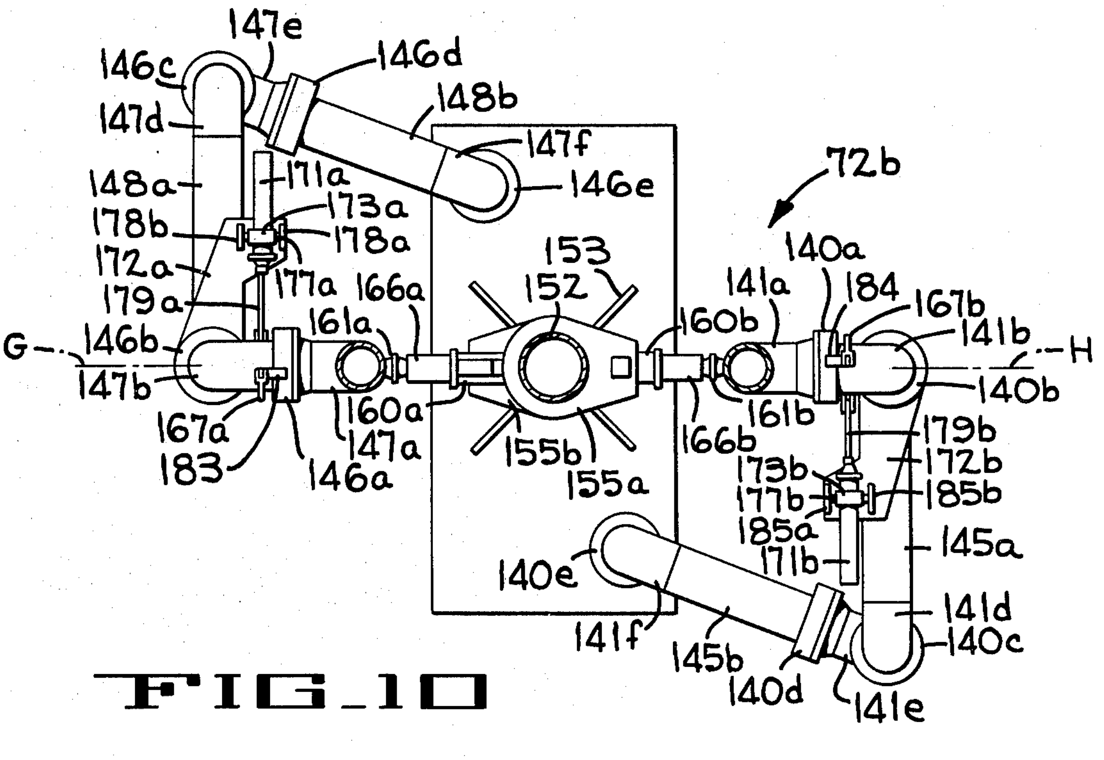
FIG. 10 is a horizontal section taken along the line 10—10 of FIG. 9.

A third embodiment 70*b* of the articulated connecting device, disclosed in FIGS. 9 and 10, includes an arm section 71 identical to the embodiment shown in FIGS. 2–8, and a tanker section 72*b* which has been modified. The elements in the third embodiment which are identical or similar to the elements of FIGS. 7 and 8 have been labeled with identical or similar numerals.

The valve 101*a* (FIG. 9) is connected to the tanker manifold 76*a* by a plurality of swivel joints 140*a*–140*e*, a plurality of pipe elbows 141*a*–141*f*, and lengths of pipe 145*a*,145*b* (FIGS. 9,10). The valve 101*b* is connected to the tanker manifold 76*b* by a plurality of swivel joints 146*a*–146*e*, pipe elbows 147*a*–147*f*, and lengths of pipe 148*a*,148*b*. The tanker section 72*b* is supported by a vertical pipe 152 which is welded or otherwise secured to a bracket 153, and the bracket 153 is welded or otherwise connected to the deck D of the tanker. The upper end of the pipe 152 (FIG. 9) is connected to a guide funnel 94*a* for receiving the guide probe 90. A pair of annular collars 154*a*,154*b* are slidably mounted around the vertical support pipe 152, and a pair of annular brackets 155*a*,155*b* are welded or otherwise secured to the pipe 152. The collars 154*a*,154*b* are moved axially along the pipe 152 by a pair of hydraulic rams 159*a*,159*b* connected between the collars 154*a*,154*b* and the brackets 155*a*,155*b* by a pair of brackets 160*a*,160*b*.

The elbow 147*a* is pivotally connected to the bracket 160*a* by a swivel joint 161*a* and a pair of axles 165*a*,166*a*. The elbow 147*a* and the valve 101*b* can be pivoted about an axis G by a bell crank 167*a* and a hydraulic ram 171*a*. The hydraulic ram 171*a* is connected to an elongated bracket 172*a* by an annular collar 173*a*, a pin 177*a*, and a pair of ears 178*a*,178*b* which are welded or otherwise connected to the bracket 172*a*. One end of the bell crank 167*a* is connected to a piston rod 179*a* of the ram 171*a*, and the other end is connected to the elbow 147*a* by a bracket 183 which is welded or otherwise secured to the end portion of the elbow 147*a*. The end portion of the elbow 147*a* also serves as the outer race of the swivel joint 146*a*. When the arm section 71 is disconnected from the tanker section 72*b* and the piston rod 179*a* is retracted into the hydraulic ram 171*a*, the bell crank 167*a*, the elbow 147*a*, the valve 101*b* and the axle 165*a* can be rotated about the axis G to allow the valve 101*b* and elbow 147*a* to extend in a downward direction from the axis G into a stored position.

The elbow 141*a* is pivotally connected to the bracket 160*b* (FIGS. 9,10) by a swivel joint 161*b* and a pair of axles 165*b*,166*b*. The elbow 141*b* and the valve 101*a* can be pivoted about an axis H by a bell crank 167*b* and a hydraulic ram 171*b*. The ram 171*b* is connected to an elongated bracket 172*b* by an annular collar 173*b*, a pin 177*b*, and a pair of ears 185*a*,185*b* which are welded or otherwise connected to the bracket 172*b*. One end of the bell crank 167*b* is connected to a piston rod 179*b* of the hydraulic ram 171*b*, and the other end is connected to the elbow 141*a* by a bracket 184 which is welded or otherwise secured to the end portion of the elbow 141*a*. The end portion of the elbow 141*a* comprises the outer race of the swivel joint 140*a*. When the arm section 71 is disconnected from the tanker section 72*b* and the piston rod 179*b* is retracted into the hydraulic ram 171*a*, the bell crank 167*b*, the elbow 141*b*, the valve 101*a* and the axle 165*b* can be rotated about the axis H and allow the valve 101*a* and elbow 141*a* to extend in a downward direction from the axis H into a stored position.

When the arm section 71 (FIGS. 9,10) of the connecting device 70*b* is to be connected to the tanker section 72*b*, the piston rods 179*a*,179*b* are retracted into the rams 171*a*,171*b* to rotate the valves 101*a*,101*b* (FIG. 9) downward to a position adjacent the pipes 145*b*,148*b* so the arm section 71 will not strike parts of the tanker section 72*b* as the guide probe 90 is moved into position above the guide funnel 94*a*. The hydraulic rams 159*a*,159*b* (FIG. 9) are retracted to slide the collars 154*a*,154*b* downward, with the collar 154*b* adjacent the bracket 155*a*, and to move the valves 101*a*,101*b* and elbows 141*a*,147*a* close to the deck D. The guide probe 90 is lowered into the guide funnel 94*a* and locked by one of several devices (not shown) which are commonly used in the industry. The rams 171*a*, 171*b* are extended to cause the bell cranks 167*a*,167*b* to rotate the elbows 141*a*,147*a* about the axes H,G to move the valves 101*a*,101*b* into an upright position adjacent the pipe clamps 100*a*,100*b*. The rams 159*a*,159*b* are extended to raise the valves 101*a*,101*b* into contact with the pipe clamps 100*a*,100*b* and the clamps are secured to the valves 101*a*, 101*b*.

Although the best mode contemplated for carrying out the present invention has been herein shown and described, it will be apparent that modification and variation may be made without departing from what is regarded to be the subject matter of the invention.

What is claimed is:

1. An articulated drop-pipe assembly for connecting first and second fluid conduits of a boom-supported offshore loading system to a marine tanker, said assembly comprising:

first and second upper pipe sections;

Cardan joint means pivotally connecting said first and second upper pipe sections to said first and second conduits, respectively, for movement of said assembly with respect to said conduits about two mutually perpendicular horizontal axes and for facilitating suspension of said assembly in a substantially vertical attitude from said first and second conduits when the loading arm is in either a horizontal or non-horizontal attitude, said Cardan joint means comprising four pipe swivel joints with the first and second joints interconnecting the first conduit and the first upper pipe section, the third and fourth joints interconnecting the second conduit and the second upper pipe section, said first and fourth joints oriented on one of said horizontal axes, and said second and third joints oriented on the other of said horizontal axes;

first and second intermediate pipe sections;

means pivotally connecting said first and second intermediate pipe sections to said first and second upper pipe sections, respectively, for movement about at least two parallel horizontal axes;

means pivotally interconnecting said intermediate pipe sections for relative movement about a horizontal axis;

first and second lower pipe sections;

means pivotally connecting said first and second lower pipe sections to said first and second intermediate pipe sections, respectively, for movement about at least two parallel horizontal axes;

Cardan joint means connected to said first and second lower pipe sections to facilitate connecting said lower pipe sections to a pair of non-coaxial fluid conduits on a marine tanker; and means suspended from said loading arm and connected to said lower pipe sections for supporting and vertically elevating said assembly.

2. An articulated connecting device for connecting first and second conduits of a fluid loading arm to corresponding first and second marine tanker manifolds, said device comprising:

first and second generally vertical pipes;

a first pair of upper swivel joints for connecting an upper end of said first vertical pipe to a lower end of said first conduit to allow said first vertical pipe to pivot about first and second horizontal axes, said first horizontal axis being substantially a right angles to said second horizontal axis;

a second pair of upper swivel joints for connecting an upper end of said second vertical pipe to a lower end of said second conduit to allow said second vertical pipe to pivot about said first and said second horizontal axes;

first and second pipe sections;

means for supporting first and second pipe sections in a generally vertical position above a deck of a marine tanker including a vertical support pipe secured to said tanker deck, first and second horizontal support members, means for connecting said first horizontal support member to said first pipe section, means for slidably connecting said first horizontal support member to said vertical support pipe, means for selectively raising and lowering said first pipe section, means for connecting said second horizontal support member to said second pipe section, means for slidably connecting said second horizontal support member to said vertical support pipe, means for selectively raising and lowering said second pipe section independently of said first pipe section;

means for selectively connecting an upper end of said first and said second pipe sections to a lower end of a corresponding one of said first and said second vertical pipes;

first swivel joint means connected between a lower end of said first pipe section and said first tanker manifold; and second swivel joint means connected between a lower end of said second pipe section and said second tanker manifold.

3. An articulated drop-pipe assembly for connecting first and second conduits of a fluid loading arm to a marine tanker, said assembly comprising:

first and second upper pipe sections;

means pivotally connecting said first and second upper pipe sections to said first and second conduits, respectively, for movement of said assembly with respect to said conduits about two mutually perpendicular horizontal axes and for facilitating suspension of said assembly in a substantially vertical attitude from said first and second conduits when the loading arm is in either a horizontal or non-horizontal attitude, said pivotally connecting means comprising six pipe swivel joints, the first and second joints oriented coaxially with one of said two mutually perpendicular horizontal axes, the third and fourth joints oriented coaxially with the other of said two mutually perpendicular horizontal axes, and the fifth and sixth joints oriented on a common axis that is parallel to one of said two mutually perpendicular horizontal axes.

4. An articulated drop-pipe assembly according to claim 3 wherein said means pivotally connecting said first and second intermediate pipe sections to said first and second upper pipe sections, and said means pivotally connecting said first and second lower pipe sections to said first and second intermediate pipe sections, comprise double knee joint assemblies, each of said knee joint assemblies comprising first and second pipe swivel joints oriented on a first common axis and interconnected by a first pipe tee, third and fourth pipe swivel joints oriented on a second common axis and interconnected by a second pipe tee, said first and second common axes being parallel, a first 180 degree pipe elbow interconnecting said first and third swivel joints, and a second 180 degree pipe elbow interconnecting said second and fourth swivel joints.

5. An articulated drop-pipe assembly according to claim 3 wherein said means pivotally interconnecting said intermediate pipe sections comprises a ball joint.

6. An articulated drop-pipe assembly according to claim 3 wherein said assembly supporting and elevating means comprises bracket means secured to said first and second lower pipe sections, and cable means attached to said bracket means and extending to said loading arm.

7. An articulated drop-pipe assembly according to claim 3 including an articulated pipe assembly for releaseably connecting the first and second lower pipe sections to a marine tanker manifold means.

8. An articulated fluid transfer system for interconnecting a pair of boom-supported fluid conduits and a marine tanker, said system comprising:

(1) an articulated drop-pipe assembly for conducting fluid between the boom-supported conduits and an articulated manifold pipe assembly connected to a manifold on the tanker, said drop-pipe assembly comprising:

(a) first and second upper pipe sections;

(b) upper Cardan joint means for pivotally connecting said first and second upper pipe sections to the two boom-supported conduits for movement of said assembly with respect to said conduits about at least two mutually perpendicular horizontal axes, and for suspending said assembly from the boom in a substantially vertical attitude when said boom is in either a horizontal or a non-horizontal attitude;

(c) first and second intermediate pipe sections;

(d) means pivotally connecting said first and second intermediate pipe sections to said first and second upper pipe sections, respectively, for movement about at least two parallel horizontal axes;

(e) means pivotally interconnecting said intermediate pipe sections for relative movement about a horizontal axis;

(f) first and second lower pipe sections;

(g) means pivotally connecting said first and second lower pipe sections to said first and second intermediate pipe sections, respectively, for movement about at least two parallel horizontal axes;

(h) lower Cardan joint means pivotally connected to said first and second lower pipe sections;

(i) means extending from said lower Cardan joint means to facilitate releasably connecting said drop-pipe assembly to first and second non-coaxial fluid conduits of said articulated manifold pipe assembly; and (j) means suspended from said boom and connected to said drop-pipe assembly for supporting and elevating said assembly;

and (2) an articulated manifold pipe assembly for mounting on a marine tanker to conduct fluid in two distinct and non-coaxial flow passages between said drop-pipe assembly and the tanker manifold, said manifold pipe assembly comprising:

(a) first and second pipe sections;

(b) means for supporting said first and second pipe sections in a generally vertical attitude above a deck of the tanker, said supporting means comprising a vertically oriented support member extending upwardly from said deck, first and second laterally extending support members connected to said vertically oriented support member for elevational movement with respect thereto, means connecting said first and second laterally extending support members to said first and second pipe sections, and means to selectively raise and lower said laterally extending support members;

(c) means for selectively connecting the upper ends of said first and second pipe sections to the lower end of said drop-pipe assembly; and (d) swivel joint means for connecting the lower ends of said first and second pipe sections to said tanker manifold.

* * * * *